(12) United States Patent
Wilkin et al.

(10) Patent No.: US 8,065,392 B2
(45) Date of Patent: Nov. 22, 2011

(54) METHODS AND SYSTEMS FOR MANAGING WEB FEED CONTENT WITH AN EMAIL CLIENT APPLICATION

(75) Inventors: Sarah Anne Wilkin, Mountain View, CA (US); Brendan Langoulant, San Francisco, CA (US); Ricci Edward Adams, Cupertino, CA (US); Scott James Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 11/924,561

(22) Filed: Oct. 25, 2007

(65) Prior Publication Data

US 2008/0306972 A1     Dec. 11, 2008

Related U.S. Application Data (60) Provisional application No. 60/933,777, filed on Jun. 8, 2007.

(51) Int. Cl.
*G06F 15/16*     (2006.01)
(52) U.S. Cl. ......... 709/218; 709/206; 709/217; 709/249
(58) Field of Classification Search .................. 709/206, 709/207, 249, 217, 218
See application file for complete search history.

(56) References Cited

U.S. PATENT DOCUMENTS

| | | | |
|---|---|---|---|
| 6,505,233 B1 * | 1/2003 | Hanson et al. | 709/204 |
| 7,136,898 B1 * | 11/2006 | Chisaki et al. | 709/206 |
| 7,421,660 B2 * | 9/2008 | Charnock et al. | 715/751 |
| 2004/0153456 A1 * | 8/2004 | Charnock et al. | 707/10 |
| 2005/0267944 A1 * | 12/2005 | Little | 709/207 |
| 2006/0206568 A1 * | 9/2006 | Verma et al. | 709/206 |
| 2007/0038712 A1 * | 2/2007 | Affronti et al. | 709/206 |
| 2007/0061487 A1 * | 3/2007 | Moore et al. | 709/246 |
| 2007/0250577 A1 * | 10/2007 | Veeramachaneni et al. | 709/206 |
| 2008/0147578 A1 * | 6/2008 | Leffingwell et al. | 706/20 |
| 2008/0147641 A1 * | 6/2008 | Leffingwell et al. | 707/5 |
| 2009/0089380 A1 * | 4/2009 | Wang et al. | 709/206 |
| 2009/0164585 A1 * | 6/2009 | Ahlin et al. | 709/206 |

* cited by examiner

*Primary Examiner* — Thu Ha Nguyen
(74) *Attorney, Agent, or Firm* — Blakely, Sokoloff, Taylor & Zafman LLP (57) ABSTRACT

Displaying web feed contents into email messages. A web feed manager formats web feed contents from a web feed to allow a user on the email client application to read web feed contents as email messages with all the controls typically provided by the email client application for an email message, such as displays with threading views and folders for saving messages. In one implementation, web feed contents archived by the email client remains linked to the web feed manager such that the archived content is updated with new content as received.

14 Claims, 12 Drawing Sheets

FIG. 10

METHODS AND SYSTEMS FOR MANAGING WEB FEED CONTENT WITH AN EMAIL CLIENT APPLICATION

CROSS REFERENCE TO RELATED APPLICATIONS

This application claims the benefit of U.S. Provisional Application No. 60/933,777, filed Jun. 8, 2007, hereby incorporated by reference.

FIELD OF THE INVENTION

This invention relates to methods for managing web feed contents as email messages within an email client application and systems which provide these methods.

BACKGROUND

Web feed content, comprising web feed articles or simply "articles" are a means to syndicate contents via the internet Web feeds allow software programs to check for updates published on a web site. To provide a web feed, a site owner publishes a list (or "feed") of recent articles in a standardized, machine-readable syndication format, such as Really Simple Syndication (RSS 2.0) or Atom. The feed can then be downloaded either by aggregator web sites that syndicate content from the feed, or by feed reader client applications. Aggregators and feed readers allow users to subscribe to feeds and then check the user's subscribed feeds regularly for new content, downloading updates and providing a view of their content. A user, however, generally must sift through articles or article summaries to find interesting topics. This can become a particularly onerous task given that it has become common to subscribe to a great number of web feeds. However, web browsers and feed readers generally lack feature-rich interfaces enabling efficient management and navigation of the many articles. Because feature-rich interfaces also come at the expense of a user learning curve, it would be desirable to utilize a feature-rich web feed interface having management and navigation features which a user has already become accustomed to, such as an email client application.

Also, if the user wishes to forward articles to a friend, if using an aggregator or web browser, the user must separately compose an email and include the article or a link to the article. In such a circumstance it would desirable for a user to have the article directly accessible to an email client application.

It is also desirable to have an email client application that can automatically sift through articles and identify topics that the user is particularly interested in. In addition, by providing articles in a form which can be displayed and managed as emails, technologies that are advantageous for email messages such as sorting via Message Rules, adding message To-dos, highlighting segments of a message via Data Detectors, and manually sorting messages by dragging them to other mailboxes may also be advantageously applied to articles. In achieving these goals a great deal of convenience may be provided to the user with out requiring the user to master a new feature-rich application interface.

Furthermore, a method for employing an email application to access web feeds without disclosing to the web feeds a user's email address to a potentially insecure third party aggregator is desirable.

SUMMARY

One aspect of the invention relates to displaying and managing web feed articles as email messages with an email client application. In one embodiment, a web feed manager retrieves articles from a feed in response to a request from an email client application. Then, the web feed manager provides the articles to the email client application. The email client application may then display the articles in-line with email messages in an incoming email message display (e.g. InBox).

In another aspect, the email client application automatically filters web feed articles received from the web feed manager and automatically stores the articles in a folder of the email client application other than the incoming email folder of the email client application. In one such embodiment, the filtering is performed based on a keyword identified in the feed, the title of the article, or the body of the article.

In another aspect, the web feed manager is implemented as a custom API. The web feed manager API provides an email client application with an interface to a web feed. The email client application polls a web feed through the API and then displays and manages the web feed articles in substantially the same manner as an email message to provide the user with a seamless integration of web feed content and email messages.

In another aspect, an article, received from a feed, can be saved or moved, (manually by the user or automatically based on a filter) into a saved folder within an email client application, and the article remains active and dynamic while stored in the saved folder, such that opening the article, after it has been saved, will reveal current or new content published by the feed during the time since the article was first saved in the folder.

In another aspect, the web feed manager is implemented as a remote server, rather than an API, which sends articles using a syndication protocol to a plurality of email client applications, each of the plurality having subscriptions to a particular feeds.

In a further aspect, the web feed manager may condense feed subscriptions common to any of the email client applications such that an article received as the result of one query to a feed is converted and sent to a plurality of email client applications.

DETAILED DESCRIPTION

Described herein are methods and systems for accessing web feed content (i.e. articles) with an email client application. In the following description, numerous specific details are set forth. However, it is understood that embodiments may be practiced without these specific details. For example, well known equivalent components may be used in place of those described herein. In other instances, well known components have not been shown in detail in order not to obscure the understanding of this description.

Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2007.

Figure 1:
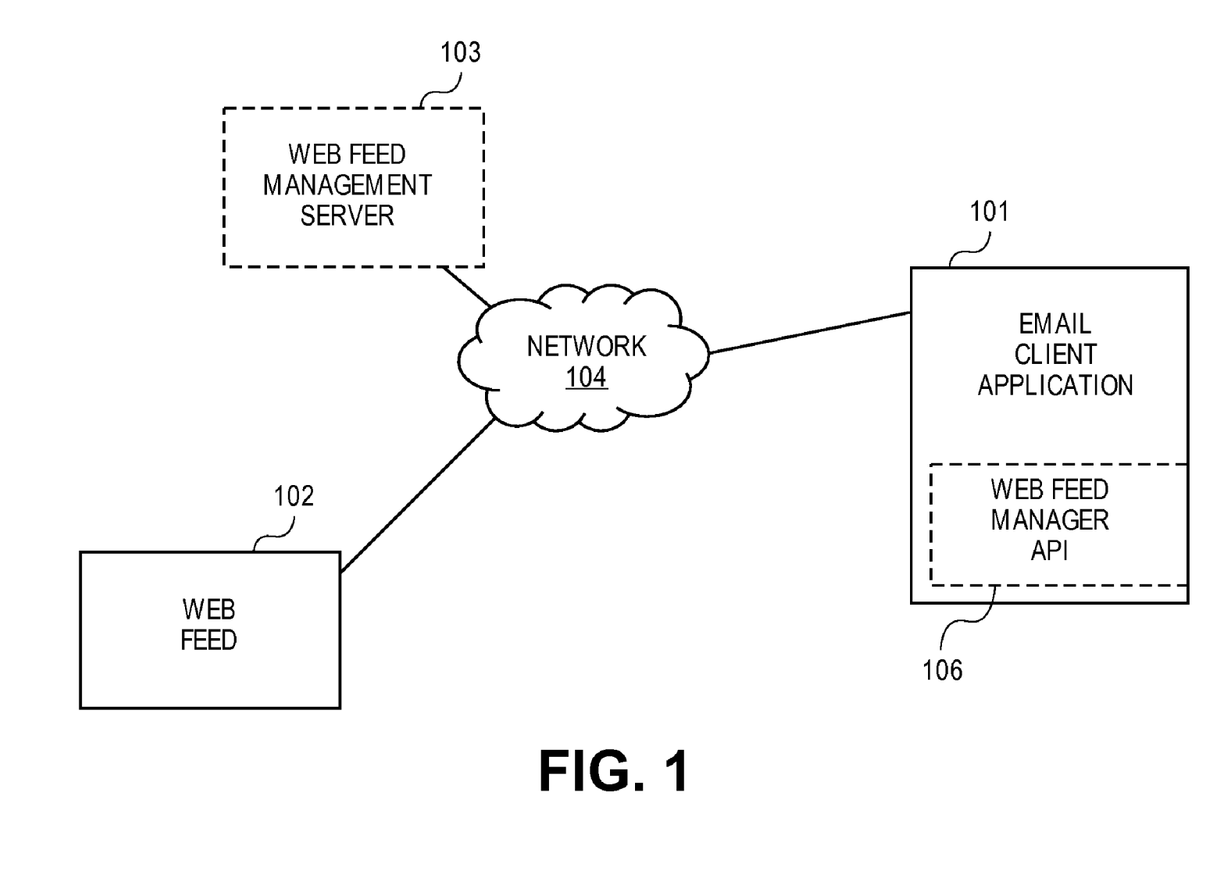
FIG. 1 is a block diagram illustrating a network environment in which the present invention regarding accessing web feed content can be implemented according to embodiments of the present invention.

FIG. 1 is a block diagram illustrating a network environment 100 in which the present invention regarding accessing web feed content with an email client application can be implemented. FIG. 1 includes alternative embodiments, depicted with dashed lines, which may be employed in combination or independently. In one embodiment, an email client application 101 includes a web feed manager API 106 responsible for retrieving web feed content. In another embodiment, the email client application 101 receives web feed content from a web feed management server 103 via a network 104. In either embodiment, the email client application 101 sends a request to the web feed management server 103 or web feed manager API 106 to retrieve new web feed content in response to a user's input to the email client application 101 (a click of an "Update Web Feeds" button, for example). The web feed management server 103 or manager API 106 then retrieves the web feed content from the identified web feed 102 and provides it to the email client application 101. The email client application then stores, manages and displays the new content in the form of one or more email messages. The web feed content may further be stored in a database accessible to the email client application. In one embodiment, the email database stores a directory or table of web feed contents stored as individual files. In other embodiments, the web feed contents are stored by way of other extensions to the email database commonly known in the art.

Figure 2A:
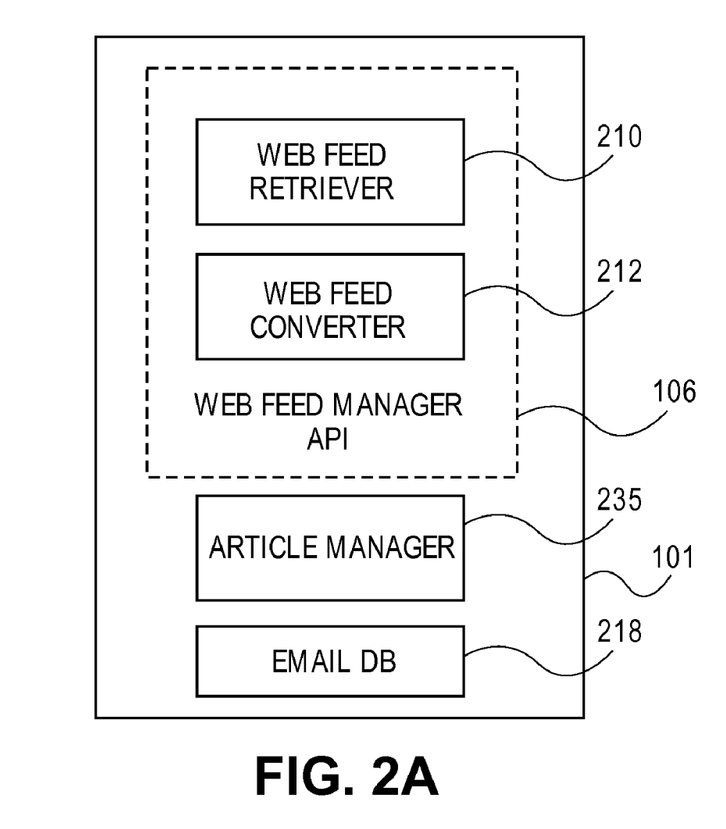
FIG. 2A is a block diagram illustrating an email client application and a web feed manager API according to an embodiment of the present invention.

FIG. 2A is a block diagram illustrating an embodiment of the web feed manager API 106 which includes a web feed retriever 210 and a web feed converter 212. The web feed retriever 210 is a module responsible for connecting to a web feed, such as one requested by an email client application, and is also responsible for retrieving web feed content added by the feed since the last time the feed was visited by the web feed manager API 106. The web feed retriever 210 receives web feed content in a syndication format, such as an RSS format (RSS 0.90, RSS 0.91, RSS 1.0, RSS 2.0, etc.) or Atom.

In an embodiment, the web feed manager API 106 further includes a web feed converter 212. In such an embodiment, the web feed converter module provides a look-up or reference table for converting or translating elements of a retrieved article conforming to a syndication format into an object format which be accessed by an application, such as email client application 101. The email client application may then manage converting the object into another format, displaying the object, and otherwise controlling a user's interaction with the object through the email client application interface in a manner similar to that of a conventional email message.

Figure 2B:
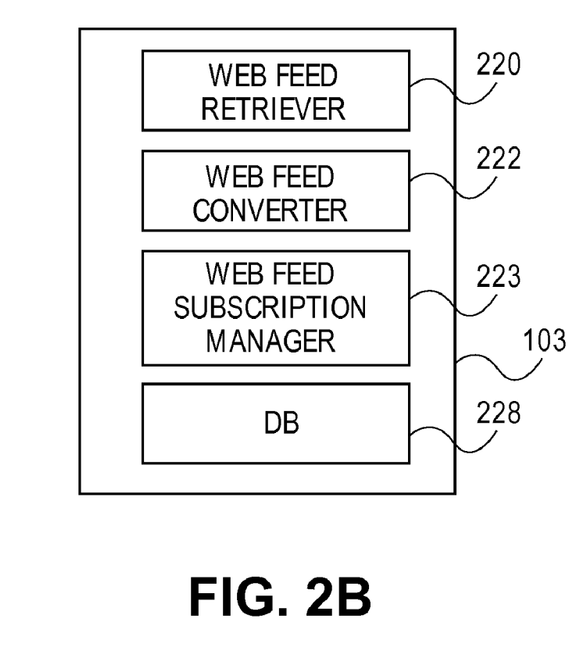
FIG. 2B is a block diagram illustrating a web feed management server according to an embodiment of the present invention.

FIG. 2B is a block diagram illustrating an embodiment of the web feed management server 103. Implementations with the web feed management server 103 are distinguished from implementations with the web feed manager API 106 in that a plurality of email client applications 101 communicate with the web feed management server 103. For this reason, while the general purpose of retrieving new web feed content is the same, web feed retriever 220 may run different processes than those of the web feed retriever 210. These differences are discussed in more detail elsewhere herein.

In the embodiment shown in FIG. 2B, web feed management server 103 further includes a web feed converter 222 responsible for converting or translating the retrieved web feed content from a syndication format into an object format that may be handled by an email client application. In one such embodiment, the web feed management server communicates these objects to the email client application. In an embodiment, the web feed management server sends email messages containing the web feed content to the email client application 101. In a further embodiment, the web feed management server 103 stores these emails containing the web feed content in the database 228 before sending them to the email client application 101. In still another embodiment, the web feed management server 103 does not include a web feed converter 222 and instead sends the web feed content in the syndication format to a requesting email client application that is adapted to handle the syndication format on the client side (e.g. includes a web feed converter 212).

As further shown in FIG. 2B, the web feed management server 103 may include a web feed subscription manager 223 as a module to condense web feed subscriptions for a plurality of email client applications, such that web feed content retrieved once from a feed source may be provided to each subscribing email application.

FIG. 2A further depicts module blocks in email client application 101 which may interface with either the web feed manager API 106 or the web feed management server 103, depending on the specific implementation. In the exemplary embodiment shown, the email client application 101 further includes an article manager 235. The article manager performs processes which determine if a received article is to be stored in a particular location within the email client folders.

In a particular embodiment, the article manager 235 maintains links to articles stored in the database 218 that is accessible to the email client application 101, such that an article received updating the content of a stored article is linked to the stored article by the article manager 235 so that the update is viewable in conjunction with the stored article. In another embodiment, the article manager 235 provides rule-based filtering of received articles. Based on the filtering, the article manger 235 may move filtered articles to a particular mail box folder of the email client application or display these articles in a mode distinguishable from the rest of the articles and/or emails. In an embodiment wherein the article manager 235, maintaining links to articles stored in the database 218, is provided in the API 106, the filtering and display of the articles may be performed by a message manager of the email client (not depicted) application.

Figure 3:
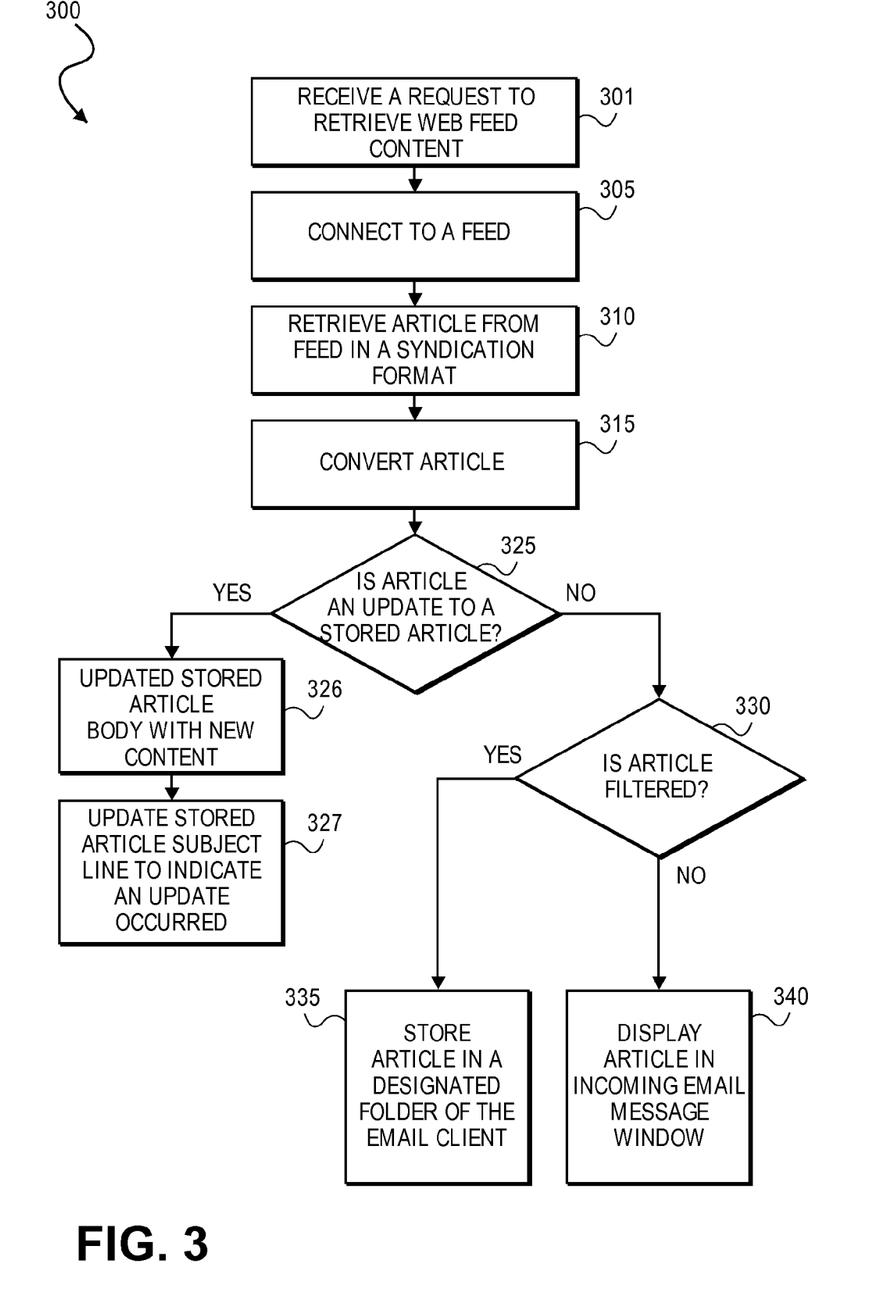
FIG. 3 is a flow diagram illustrating the process of displaying web feed articles as an email message by an email client application, according to an embodiment of the present invention.
Figure 4:
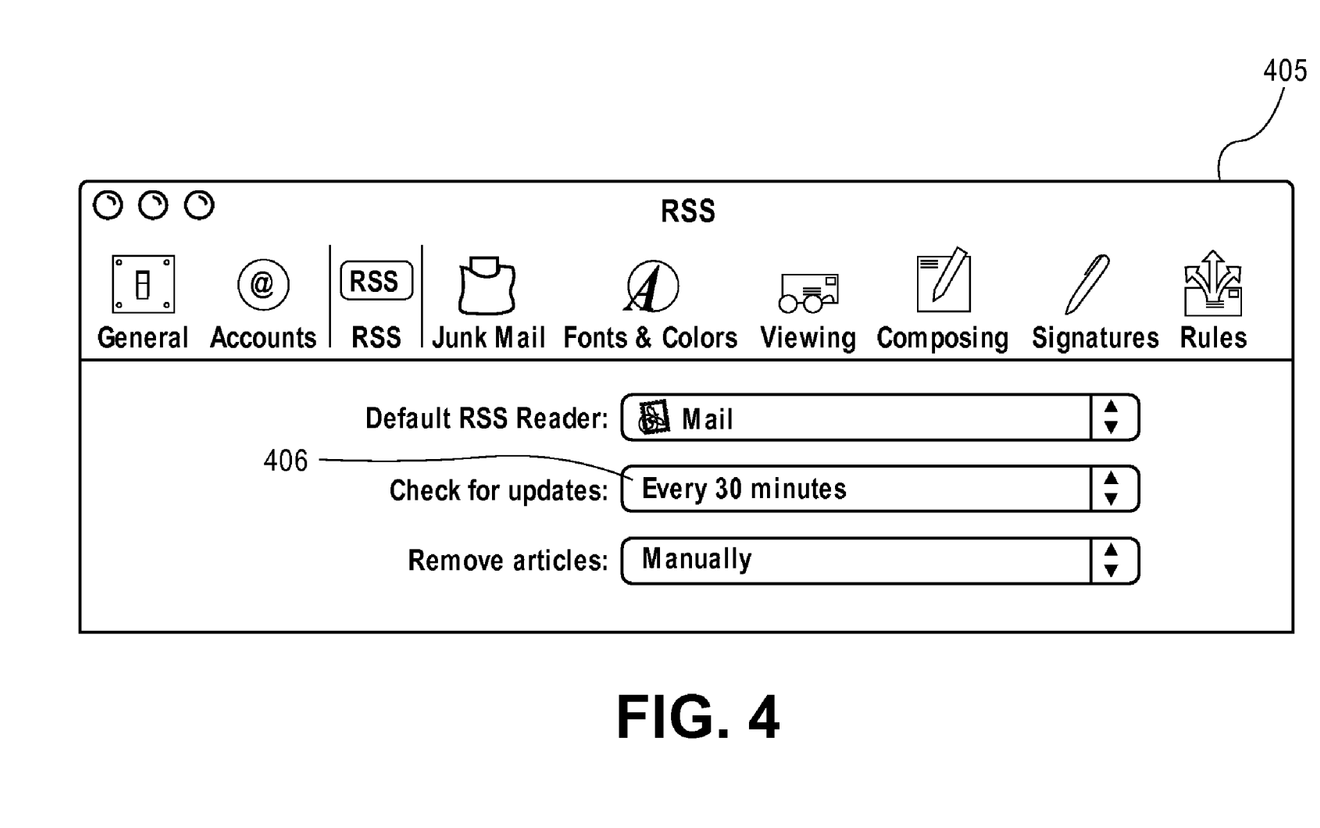
FIG. 4 depicts a display of an email client's preferences for receiving input for requesting web feed articles in accordance with an embodiment of the present invention.

FIG. 3 is a flow diagram illustrating an exemplary process 300 for accessing web feed content, such as an article, with an email client application according to an embodiment of the present invention. The process depicted is discussed in the context of a specific embodiment employing a feed manager API, such as that of FIG. 2A. Process 300 begins with a data processing system receiving a selection of a command to retrieve web feed content. In one exemplary implementation, the user input is received with a selection device, such as a mouse, directed at an object presented to the user in a display of email client application preferences, such as that depicted in FIG. 4. As shown in FIG. 4, a user interface 405 may be provided by an email client application process to provide for the user to input a selection of "on-demand" or "periodic" requests for web feed content preferences of the email client. As further shown in the exemplary embodiment of FIG. 4, a periodic request interval of 30 minutes is established with drop-down box 406. Alternatively, with a selection of a "manual" request option, the user may position a cursor, using a cursor control device such as a mouse, over a button, such as one labeled "Web Feed" or "Get Mail" displayed within a display of the email client, and may press a button, such as the mouse's button, to select the command to retrieve web feed content. Alternative user interface techniques may be employed as well; for example, one or a sequence or a set of keystrokes, either in sequence or concurrently, may be used to provide the command.

In an embodiment, web content retrieved by the process is "new" content. New content is all content that has been added to a feed since the last time the feed was polled for content. In one implementation, new content may be determined by providing the web feed manager API the time a web feed was last queried by the email client application for content. In an alternate implementation, the web feed manager API may include logic to log all queries made of web feeds by the API at the request of all RSS client applications, (email client, web browser client, etc.). In a particular embodiment, the web feed manager API further synchronizes the state of a web feed article between multiple RSS client applications. For example, after a web feed article is accessed by the web feed API via an email client application, not only would the email client application provide an indication that particular had been "read," but so too would any other RSS client application (such as a web browser). In this manner the "read" state of an RSS article once accessed would be synchronized across multiple RSS clients.

The request to retrieve web feed content may include any number of web feeds. In an exemplary embodiment, a web feed subscription list is maintained by the email client. The subscription list may include an identifier of a web feed, such as a universal resource locator (URL) and may further include a periodic schedule for initiating a request for web feed content. The data processor may then, at operation 301, automatically send a scheduled request to retrieve web feed content. Upon receipt of input for "on-demand" retrieval or input initiating a periodic retrieval, process 300 proceeds to operation 305.

At operation 305, the web feed manager API connects to a web feed. Upon successful connection, at operation 310, the feed manager API retrieves a web feed article which has been newly added to the feed since the last time the source was visited. As retrieved from the web feed, the web feed article is in a syndication format including various elements along with the body of the article. An exemplary syndication format is RSS 2.0 which may include channel elements pertaining to the feed from which the web feed article originated and/or include item elements pertaining to the format of the article. Channel elements, include, but are not limited to, "title" (title of the channel or web feed) and "pubdate" (publication time and date of articles of the web feed). Item elements, include, but are not limited to, "title" (the title of the article), "link" (URL of the article), "description" (summary of the article), "source" (the RSS channel or feed from which the article came from), and "pubdate" (the time and date the item was published or added to the feed).

Following operation 310, the received web feed article format is converted such that the web feed article can be interpreted as an email message by the email client application. In an embodiment, the conversion process creates a representation of the web feed article in the email client-accessible database. For example, elements of a syndication format may be converted into email fields, such as, but is not limited to, those defined by the Internet Engineering Task Force (IETF) in Request for Comments (RFC) 2822 and RFC 2045-RFC 2049. In one exemplary implementation, a web feed article is converted such that the article "title" element populates the "Subject" header field of an email message and the body of the article populates the body of the email message. In another embodiment, a web feed article is converted such that the article "source" element populates the "From" header field of an email message. In still another embodiment, a web feed article is converted at operation 315 such that the channel "title" element (i.e. feed) populates the "From" header field of an email message. In yet another embodiment, a web feed article is converted at operation 315 such that either the channel or article item "pubdate" element populates the "Date" header field of an email message.

For clarity of discussion, once a web feed article is converted by the processing system to an email representation, it is still referred to herein as a web feed article to maintain the distinction between a web feed article and a conventional email message. As described, it should be appreciated that the conversion or interpretation process at operation 310 populates fields in the database (any email database or database accessible to email client) utilized for management and display of the database records through the email client application interface. Thus, the article conversion process may retain one or more syndication elements whether or not such elements may be converted to populate a field typical of an email message record. For example an RSS "title" element may be utilized to populate a "Subject" field in the email database and also retained in the database as a "title" element. Such retained elements may populate fields unique to syndicated article records in the email database, any one of which may be utilized by the processing system to identify a particular record in the email database as one of a syndicated article rather than an email message.

In the embodiment depicted in FIG. 3, the processing system determines, at operation 325, if the web feed article is an update to a web feed article archived in the database accessible to the email client application. An update to a web feed article may occur for a variety of reasons, most typically when an authors corrects an error to an earlier article. However, an update may also correspond to a comment posted to the article, a content modification made to a collective work, such as a wiki, etc. In the particular embodiment shown in FIG. 3, the process maintains all web feed articles in the email client-accessible database "live" or "linked" to their sources to ensure such content updates are propagated to the content stored in the email client-accessible database. The processing system may determine a received web feed article is an update to a stored web feed article based on a comparison of one more of the article elements, or their equivalent field(s) after conversion/translation of the web feed article into an email record representation.

In an exemplary embodiment, an update is identified as a web feed article having the same "title" element as that of a stored web feed article but having a more recent "pubdate" than that of the stored web feed article. In another implementation, where the conversion at operation 315 results in a "Subject" header field being populated with the "title" element of an article and a "Date" header field being populated with the "pubdate" element of the article, an update to a stored web feed article is identified as a web feed article having the same "Subject" header field as that of a stored web feed article but having a more recent "Date" header field value than the stored web feed article. If the processing system determines the received web feed article is an update to a web feed article stored in the email client-accessible database, the process proceeds to operation 326. If the processing system determines the received web feed article is not an update to a web feed article stored in the email client-accessible database, the process proceeds to operation 330.

At operation 326, the processing system adds the update to the stored web feed article. The update may then be displayed by the process in response to a user inputting a request to view the stored article. Operations 325 and 326 enable the processing system to maintain all web feed articles in the email-client accessible database "live" or "linked" to their sources. Thus, while stored in the email-client accessible database, the article record may nevertheless be kept up to date via particular RSS elements associated with the article in the database and subsequent polling by the email client of the web feed responsible for providing the stored article and subsequent updates to the article. In this manner, the email-client accessible database accessible to the email client may serve as a personalized knowledge management database (e.g. as a personalized subscription to a wiki) containing articles having content of interest to the user without severing that content from the content provider (i.e. feed) as of the date the content is downloaded from the feed. As long as the provider supports syndication (via RSS, etc.) and the user elects to poll the feed for content, content updates, etc., the articles stored in the email client-accessible database may be automatically maintained by the processing system to include additional content for each stored article as it becomes available.

In still another embodiment, updates to previously stored web feed articles are the only content the processing system stores. In such an embodiment, new content is discarded by the system unless the new content is an update of one or more web feed articles previously stored in the email-client accessible database. Such a process may be scheduled to run automatically to keep articles previously stored updated without adding new, but otherwise unrelated, content to the database each time a web feed was polled for new content.

Figure 5:
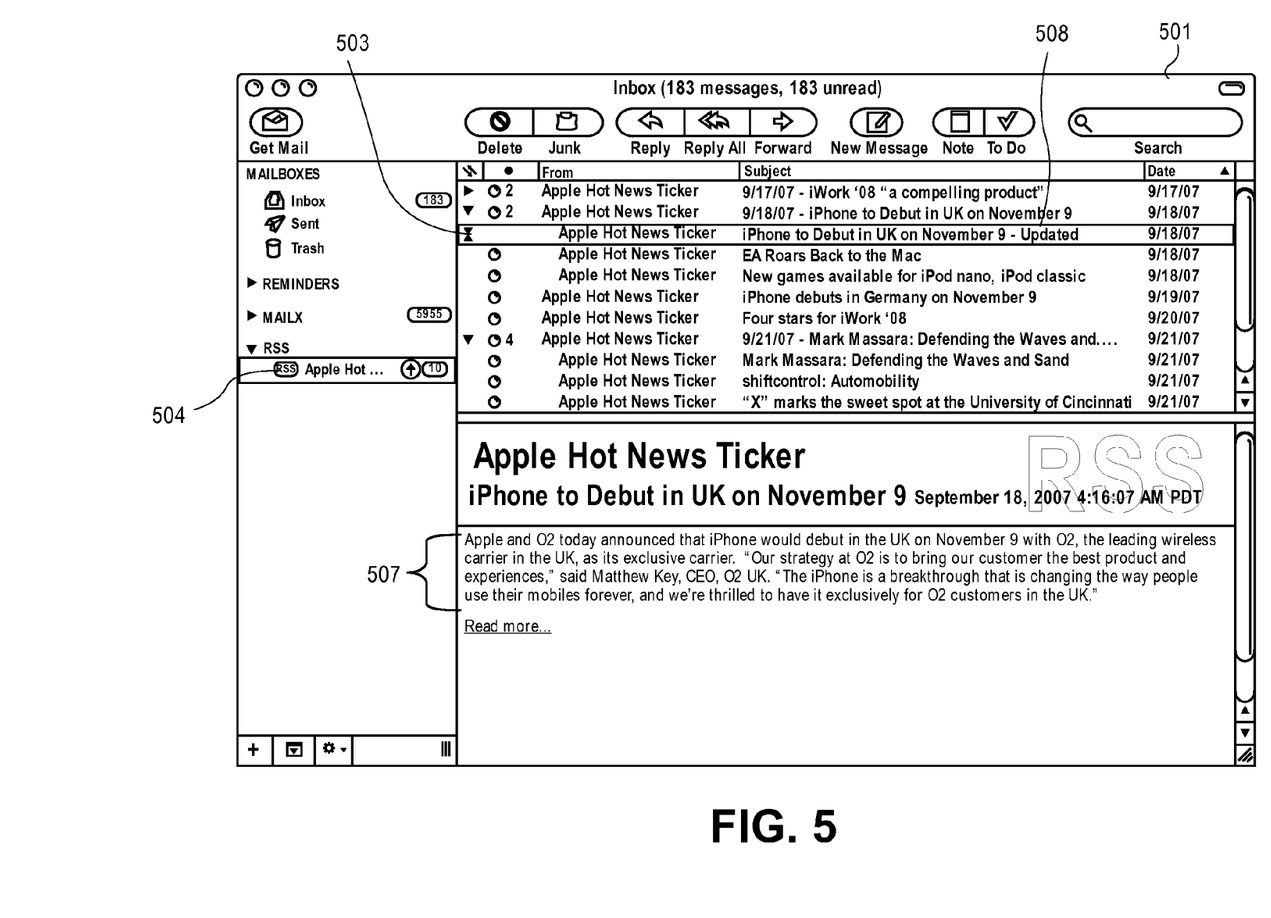
FIG. 5 depicts a web feed article update of a web feed article stored as a message in a folder of an email client in accordance with an embodiment of the present invention.

Depicted in FIG. 5, is an updated web feed article 503 stored for display from the email client folder 504 and presented to a user within the display 501 of an email client. The updated web feed article 503 has received an update in accordance with an embodiment of the present invention. In the exemplary embodiment depicted, the updated article body 507 replaces the body of the stored web feed article. The prior version of the article body may be deleted by the processing system. In an alternative embodiment, the updated article body 507 is appended to the body of the stored web feed article to provide a means for tracking changes. As further shown in FIG. 5, the header 503 of the updated web feed article includes a visual indication that the article has been updated, such as with the subject line update indication 508.

At operation 327, web feed article header 505 of the stored web feed article is displayed with the subject field 506 demarked with an indication 507 that the web feed article has received a content update. In a further embodiment, the "Date" header field is modified to reflect the data of the update.

Where the received web feed article is not an update associated by the processing system with a stored web feed article, the processing system may perform an alternate filtering of the received web feed article at operation 330. Because the article is interpreted into an email message representation, the processing system may employ many of the conventional email message filtering processes and user interfaces to filter web feed articles. A user may set a rule to filter the web feed article in substantially the same manner a rule would be set for filtering conventional email messages. The filter may be a "real" filter by which the processing system determines to store a web feed article in a particular folder of the email client other than the default incoming mailbox. The filter may also be a logical filter which, rather than designating a storage folder within the email client, provides a customizable view of web feed articles meeting the filtering criteria that are stored in any folder of the email client.

Figure 6A:
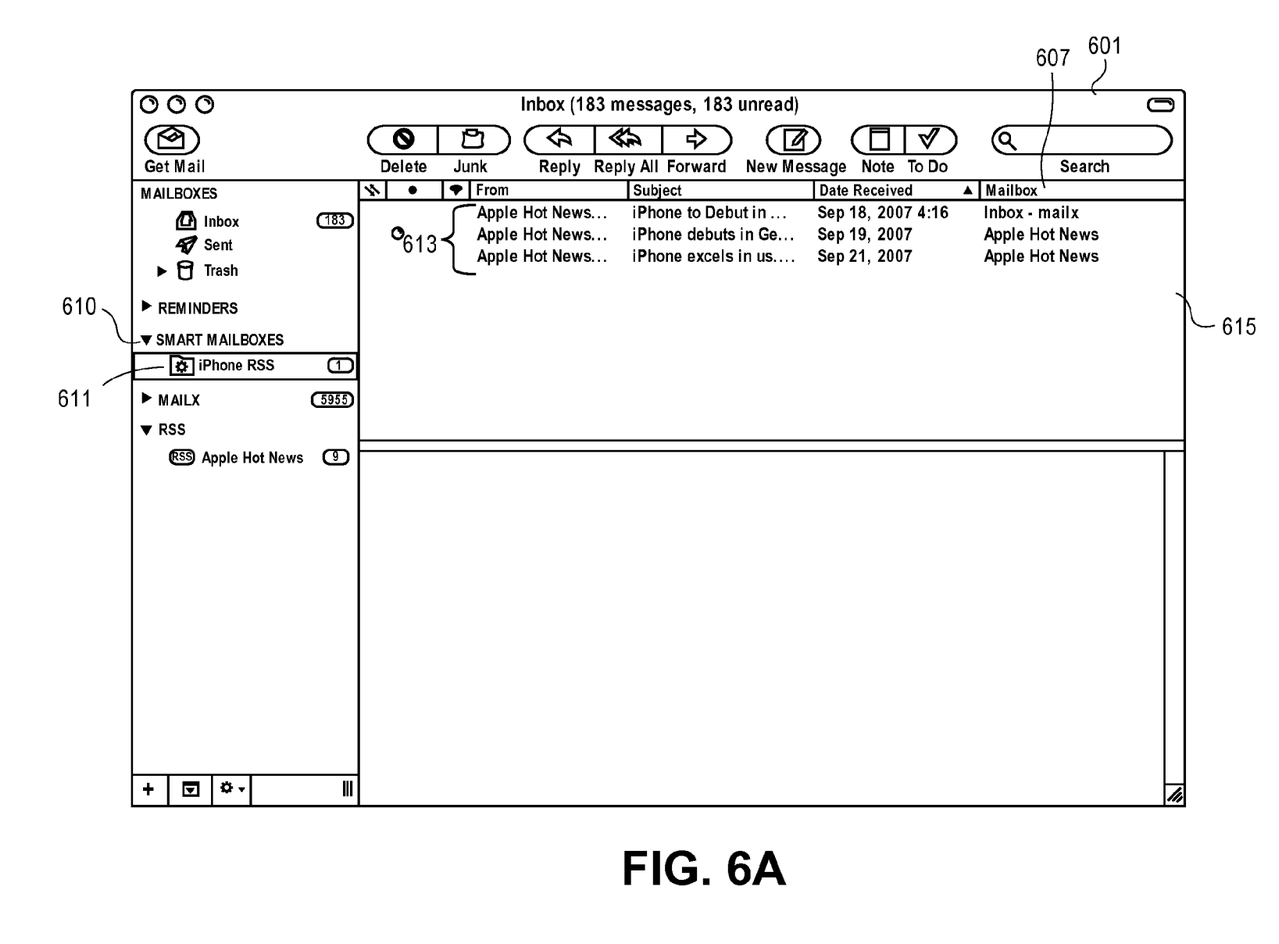
FIG. 6A depicts a web feed article filtered by keyword in accordance with an embodiment of the present invention.

In one embodiment, a logical filter is provided which generates a view of all web feed articles received, no matter what folder the web feed article is stored under in the email client. In this manner, a logical filter may distinguish web feed articles from email messages (containing no syndicated content). FIG. 6A depicts web feed content filtered by keyword in accordance with an embodiment of the present invention. A "Smart Mailbox" is an embodiment of a logical filter. As shown, Smart Mailboxes 610 are displayed within the email client application display 601. The Smart Mailbox 611 filters web feed articles, and when selected as depicted in FIG. 6A, the header display 615 displays header lines 613 for web feed articles matching the particular filter parameters. As shown, display 615 includes the mailbox 617 the directory structure with which the web feed articles are stored within the email client-accessible database.

Figure 6B:
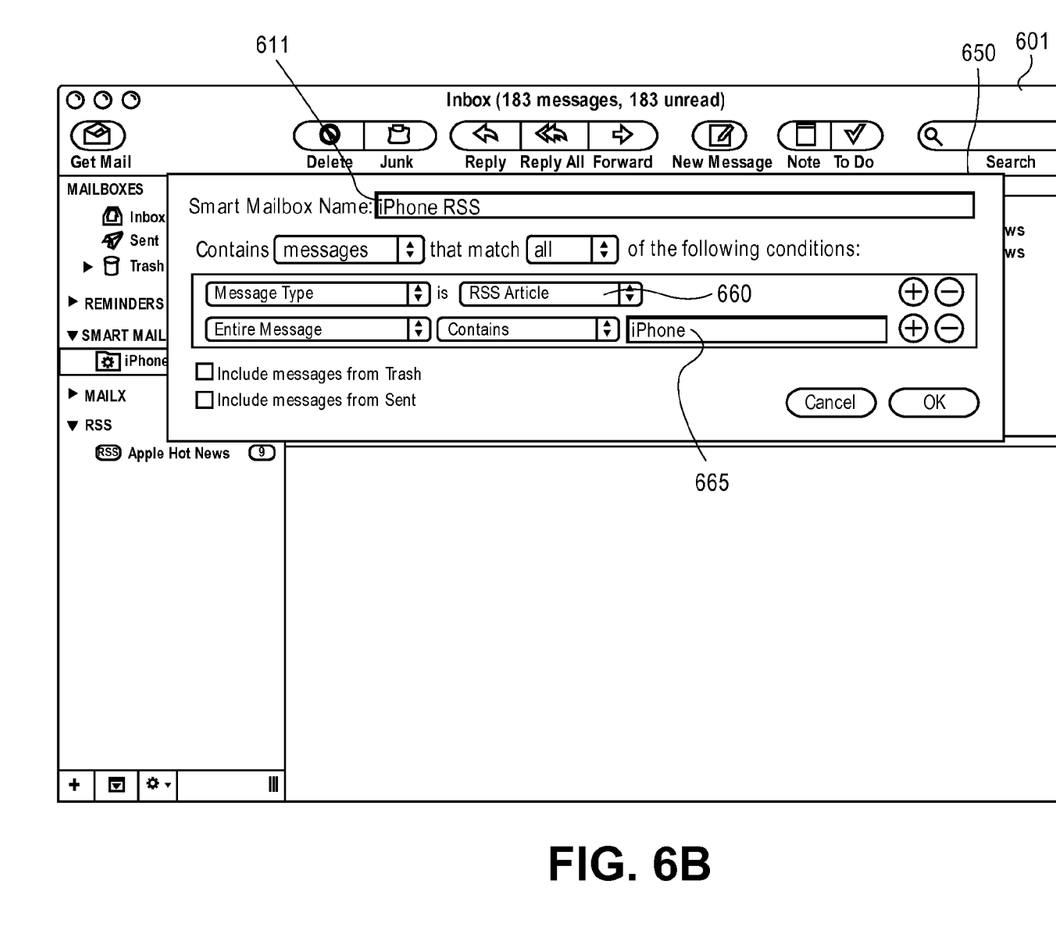
FIG. 6B depicts a web feed article filter user interface in accordance with an embodiment of the present invention.

The Smart Mailbox 611 filter criteria may be set up for web articles in a manner similar to that used for conventional email messages. In the exemplary embodiment shown in FIG. 6B, a user interface 650 separate from the email client application display 601. Within user interface 650, the Smart Mailbox Name 655 is defined and the message type set to web feed articles with the drop-down box 660. A filter may be applied with any number of rules. For example, as further shown in FIG. 6B, a rule may be based on the keyword 665 found within an article element, such as, but not limited to, "pubdate," "title," article item "source" (e.g. author or channel).

Figure 7:
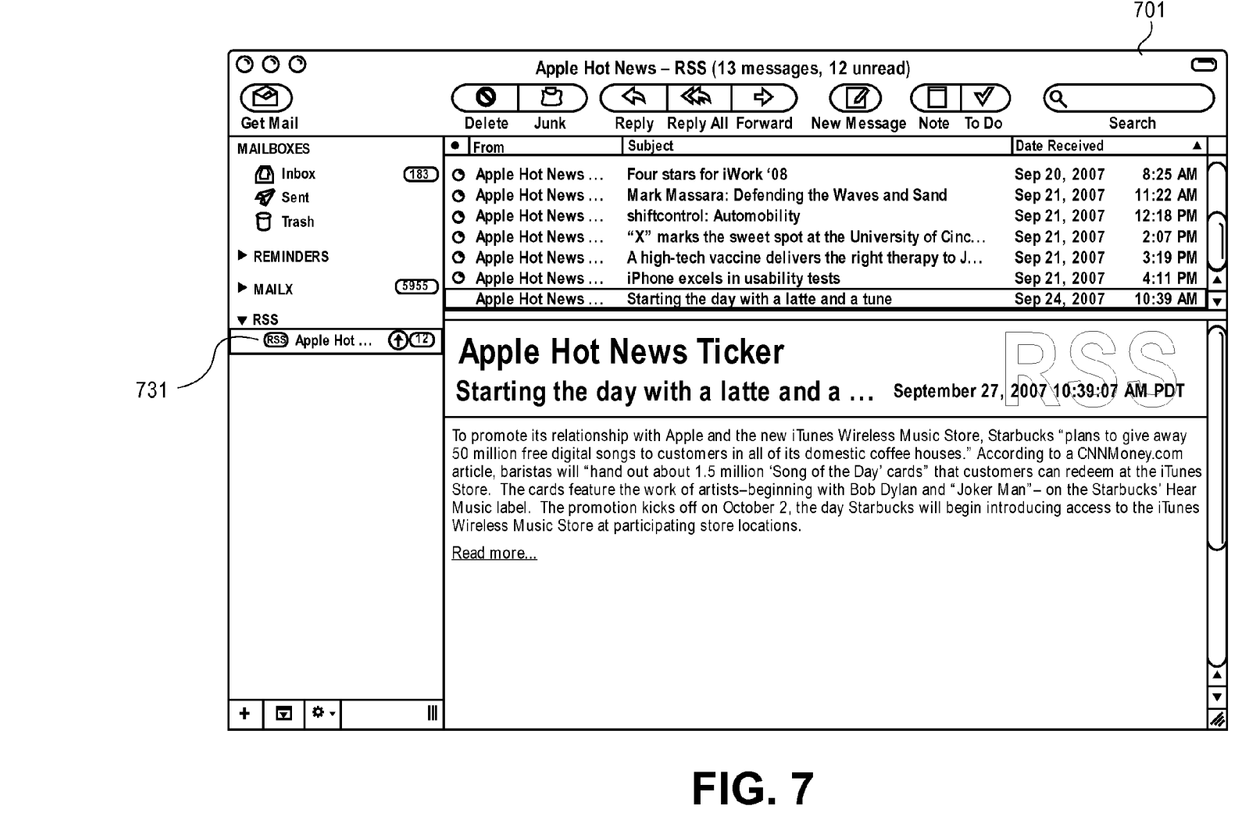
FIG. 7 depicts a web feed article stored as a message in a folder of an email client in accordance with an embodiment of the present invention.

If the web feed article is to be filtered by the processing system with a real filter criteria, the process proceeds to operation 335. If web feed article is not to be filter by the processing system with a real filter criteria, the process proceeds to operation 340. At operation 335, the received web feed article is displayed as stored in a folder location within the email client designated by the rules of the filter applied at operation 330. In an embodiment, the received web feed article is stored to be displayed in a folder other than the default incoming email message folder, such as an "RSS" folder, etc. For example, FIG. 7 depicts a filtered web feed article in the "Apple Hot News" folder 731 of an email client application view 701. In this exemplary embodiment, the data processing system applied a real filter to a received web feed article to automatically store the web feed article in the folder 731. In a further embodiment, the received web feed article is deleted or marked for deletion based on a filter criteria (or not meeting a filter criteria). In a further embodiment, a group of feeds may be aggregated under a single folder and the articles received from each feed may be displayed in-line with one-another to allow a user to group web feed content from a plurality of feeds. For example, the "Apple Hot News" folder 731 may be configured to further include articles received from a second feed, such as "Apple Hotter News." Headers of articles received from both "Apple Hot News" and "Apple Hotter News" would then be displayed in-line or together, within a common display, such as the header display 615 of FIG. 6.

Figure 8A:
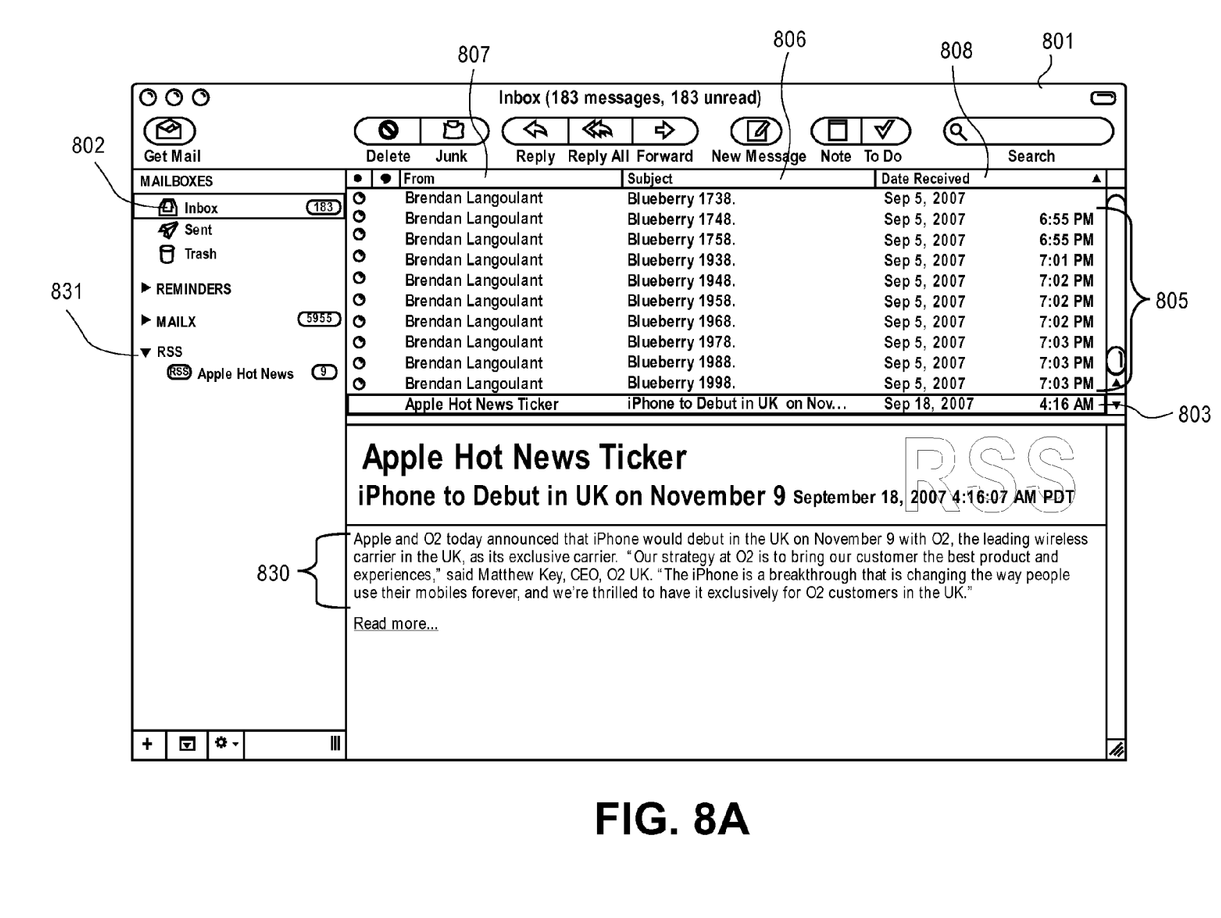
FIG. 8A depicts an incoming email message display of web feed articles in-line with conventional email messages in accordance with an embodiment of the present invention.

If a real filter is not applied at operation 330, the received web feed article is stored to be displayed in a default incoming email message folder (e.g. InBox 802 shown in FIG. 8A). In an embodiment, the web feed article displayed in the InBox as an incoming email message along with, or "in-line" with, conventional email messages (conforming to email protocols) in an incoming email message display. FIG. 8A depicts an exemplary incoming web feed article header 803 within an email client application view 801. As depicted, the processing system displays the web feed article header 803 as a line-item adjacent to email message header lines 805. The web feed article header 803 includes a "Subject" field 806 displaying the article "title," a "From" field 807 displaying the article "source," and a "Date" field 808 displaying the article "pubdate." In response to a user's selection of the web feed article header 803, the processing system displays the body of the web feed article in the email message body display 830. In an alternative embodiment (not shown), all articles received from a particular feed in response to a single query by the processing system are displayed in the body of one web feed article with the feed displayed as the subject header field.

With email representations according to embodiments of the present invention, any other commonly employed email message display or management task may be performed by the processing system in-line with conventional email messages. For example, the processing system may sort the display of the incoming email message header lines to display web feed articles as a group separate from email messages, etc. Similarly, from the InBox, the processing system may relocate storage of the web feed article to any other folder in the email client, such as an RSS folder 831, in response to a user's input, such as a click-and-drag or key stroke sequence indicating the web feed article header 803 (and the associated web feed article) is to be moved from the InBox to an RSS folder 831.

In a further embodiment, multiple related web feed articles may be displayed in threaded form. In an exemplary embodiment, a threaded display of web content may be employed when more than one article is received from a particular feed.

Figure 8B:
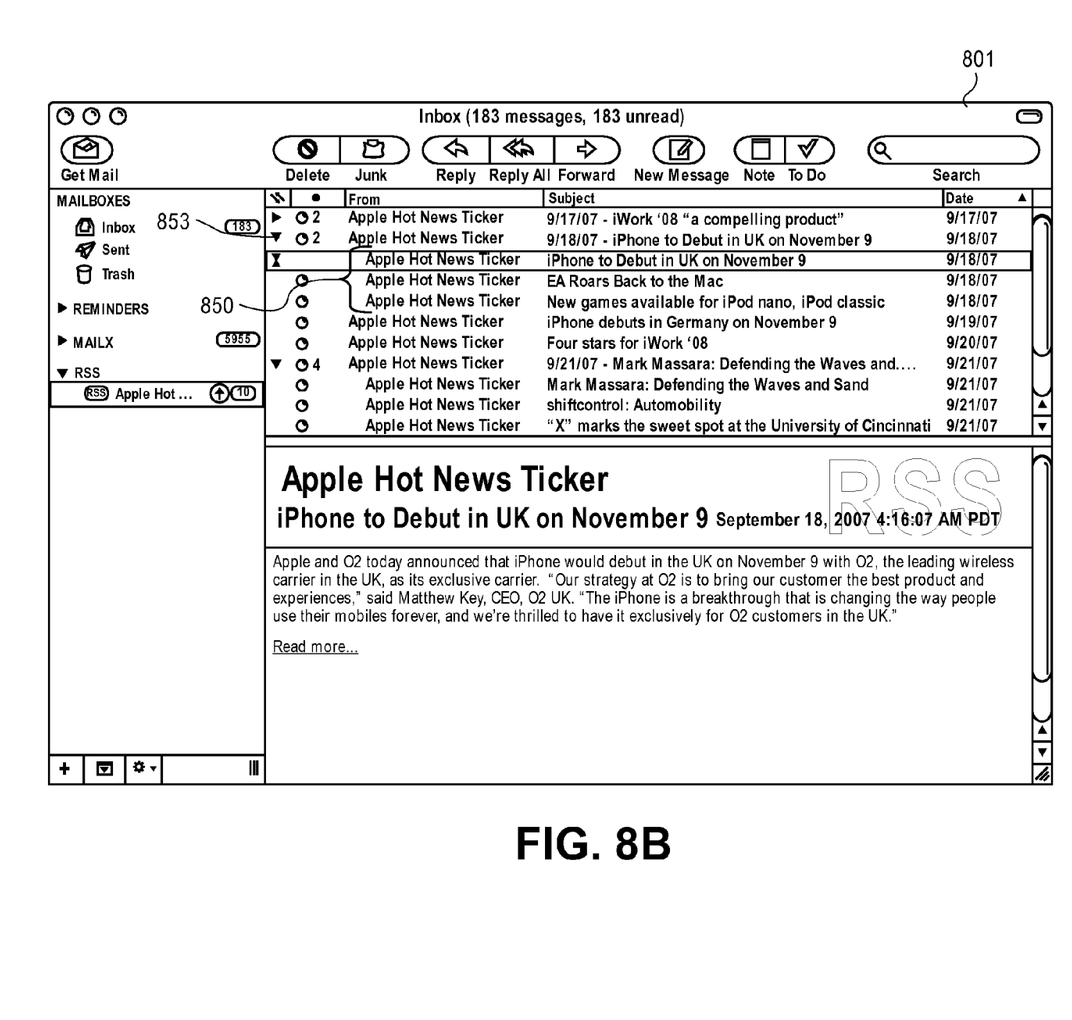
FIG. 8B depicts a threaded display of web feed articles in accordance with an embodiment of the present invention.

Referring to the exemplary embodiment shown in FIG. 8B, all web feed articles received from a single feed source in response to a request made on a particular day are displayed in the incoming email message header display of email client application view 801. All web feed articles from that source may be displayed as a single line and may further be indicated to threaded with a corresponding thread control 853. In response to a user's input to thread control 853, the process expands the single header line entry into a multi-lined header display, as shown in FIG. 8B, with each of the lines 850 in the expanded view displayed as a separate header line entry off the root message header associated with the thread control 853. The threaded display may then be collapsed by the process in response to a user's selection of the thread control 853.

In an alternative embodiment, a threaded display of web content may be employed when more than one article is received from more than one feed in response to a particular query for web feed content. In one embodiment, all articles received from a particular feed, in response to a single query by the processing system, are displayed in the body of one web feed article with the feed (i.e. source) displayed as the subject header field. Threading may be applied by the processing system across feeds to allow the user to expand and collapse the header line item entries for web feed articles received from a plurality of feeds. In this embodiment, a plurality of articles from one feed are packed into a single email message display and a plurality of feeds are packed into a single header line display through the use of the threading display.

Figure 9:
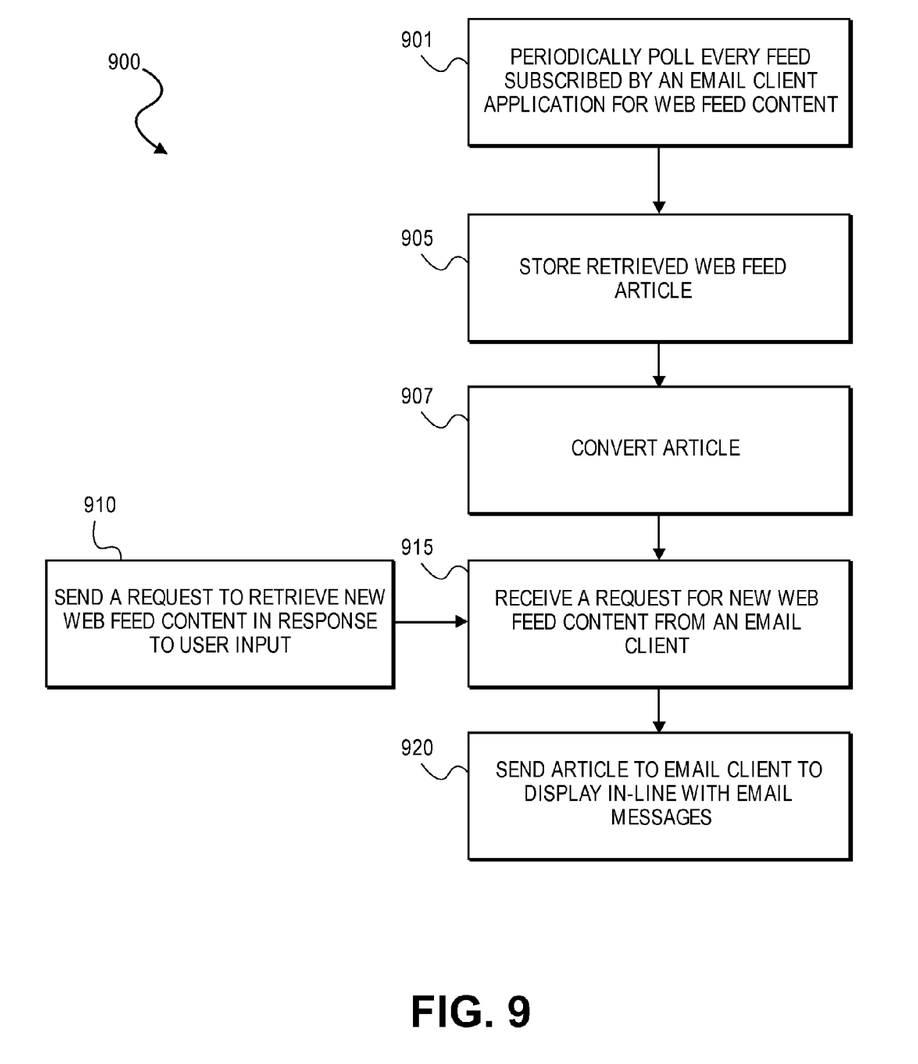
FIG. 9 is a flow diagram illustrating the process of sending web feed articles to a plurality of web feed subscribers, according to an embodiment of the present invention.

As previously described, an alternative implementation may employ a web feed management server, such as web feed management server 103 of FIG. 1. For such an embodiment, a plurality of email client applications are provided email message representations of web feed content. FIG. 9 is a flow diagram illustrating a process 900 of sending web feed contents to a plurality of web feed subscribers. At operation 901, a process of the web feed management server 103 retrieves web feed content periodically for each feed subscribed to by all email client applications. In an alternate embodiment, on-demand retrieval of web feed content is also supported by the web feed management server.

In one embodiment, at operation 905, web feed content in the form of articles is converted by a process module, such as web feed converter 222, into email message representations of the web feed articles in manner substantially as described elsewhere herein. In a particular embodiment, the title of the content becomes the subject line of the email message and the body of the content becomes the body of the email message. In another embodiment of the present invention, the web feed management server 105 creates one email representation to include all of the added contents for a particular feed. The subject line of this email message could contain, for example, the name of the web feed. In an alternative embodiment, the conversion operation 905 is instead performed by the email client application in a manner substantially as described elsewhere herein. At operation 907, a process stores web feed content retrieved in a database of the web feed management server, such as web feed management server database 228 of FIG. 2B.

At operation 910, a process of an email client application, such as email client application 101 of FIG. 1, sends a request to the web feed management server 103 for web feed content in response to user input for such content. A process of the web feed management server 103 receives this request at operation 915. In one embodiment, the request includes a user's identifier, an identifier of at least one web feed from which a content update is desired, and the last time an update from the web feed(s) was received by the email client application 101.

After receiving the request at operation 915, the web feed management server 105 determines whether the requested web feed is already a subscribed web feed by searching the web feed management server database 228. If the requested feed is not in the database, the web feed management server 105 connects to the new web feed, retrieves recently added web feed contents and adds it to the database. In one embodiment, if the requested feed is in the database, the web feed management server 105 returns all new content stored in the database to the email client application at operation 920. In this manner the web feed management server condenses the web feed subscriptions of multiple email client applications.

Figure 10:
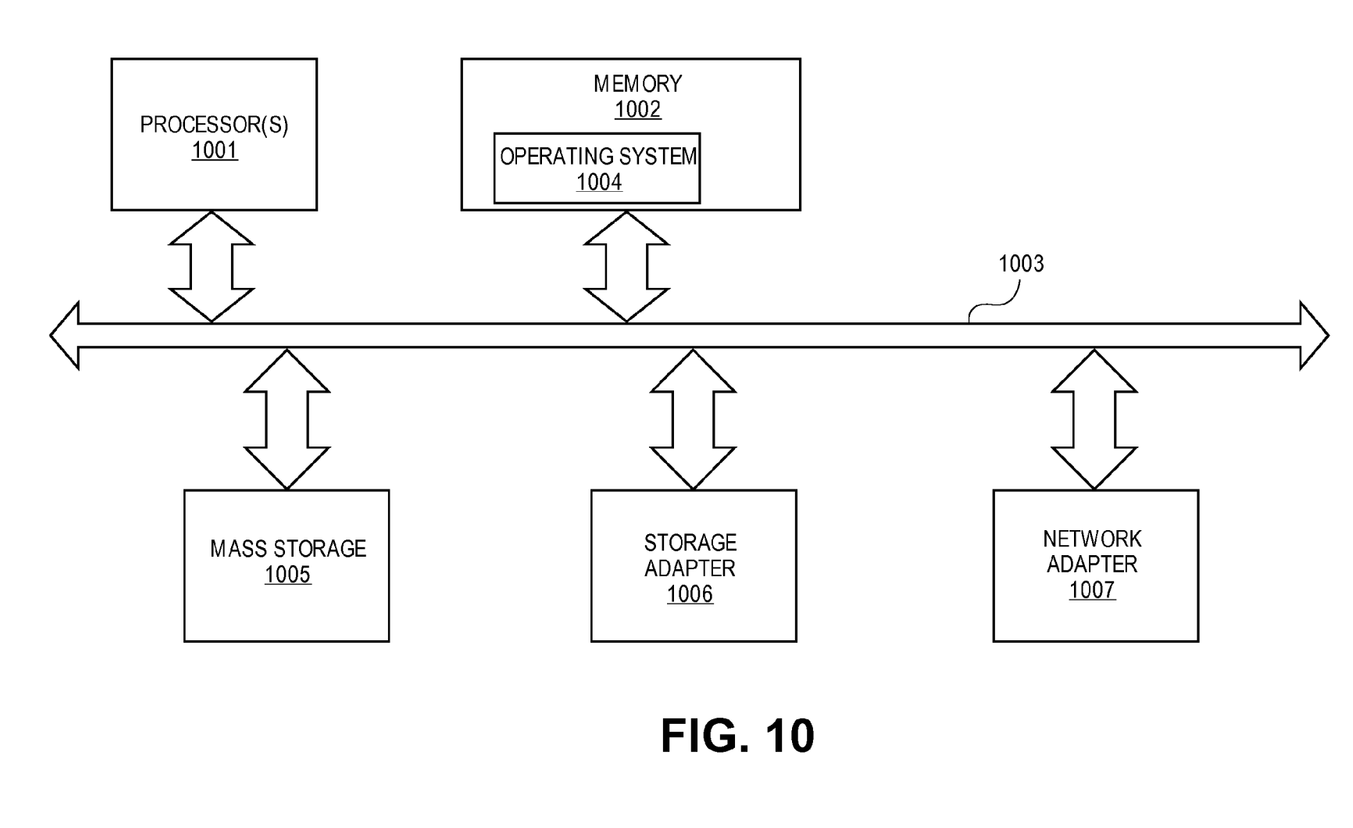
FIG. 10 is a high level block diagram illustrating a processing system.

FIG. 10 is a high level block diagram illustrating a processing system. The email client application, the email server, or the web feed management server described in the present application can be implemented by such a processing system illustrated in FIG. 10. Certain standard and well-known components which are not germane to the present invention are not shown. The processing system includes one or more processors 1001 coupled to a bus system 1003.

The bus system 1003 in FIG. 10 is an abstraction that represents any one or more separate physical buses and/or point-to-point connections, connected by appropriate bridges, adapters and/or controllers. The bus system 1003, therefore, may include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The processors 1001 are the central processing units (CPUs) of the processing system and, thus, control the overall operation of processing system. In certain embodiments, the processors 1001 accomplish this by executing software stored in memory 1002. A processor 1001 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 1002 coupled to the bus system 1003. The memory 1002 represents any form of random access memory (RAM), read-only memory (ROM), flash memory, or a combination thereof. Memory 1002 stores, among other things, the operating system 1004 of the processing system.

Also connected to the processors 1001 through the bus system 1003 are a mass storage device 1005, a storage adapter 1006, and a network adapter 1007. Mass storage device 1005 may be or include any conventional medium for storing large quantities of data in a non-volatile manner, such as one or more disks. The storage adapter 1006 allows the processing system to access external storage systems. The network adapter 1007 provides the processing system with the ability to communicate with remote devices and may be, for example, an Ethernet adapter or a Fibre Channel adapter.

Memory 1002 and mass storage device 1005 store software instructions and/or data, which may include instructions and/or data used to implement the techniques introduced here. The system may include other components (e.g., input devices, such as a mouse and keyboard, and output devices such as a display).

Software to implement the technique introduced here may be stored on a machine-readable medium. A "machine-accessible medium," as the term is used herein, includes any mechanism that provides (i.e. stores and/or transmits) information in a form accessible by a machine (e.g. a computer, manufacturing tool, any device with one or more processors, etc.). For example, a machine-accessible medium includes recordable/non-recordable media (e.g. read-only memory (ROM); random access memory (RAM); magnetic disk storage media; optical storage media; flash memory devices; etc.), etc.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, particularly gracefully implementations that are to be regarded in the illustrative rather than in a restrictive sense.

What is claimed is:

1. A non-transitory computer readable storage medium having instructions stored thereon which cause a data processing system to perform a method comprising:
   requesting web feed content in response to an input received in a display of an email client application executing on the data processing system;
   receiving, in response to the requesting, a plurality of web feed articles in a syndication format from a single source, the plurality of articles associated with different dates; and
   displaying a single header line for two or more of the plurality of articles associated with a same date, wherein the single header line is displayed in-line with a header of a received email message in an incoming email message display of the email client application, and wherein at least one of a web feed0020article title and a web feed article source is displayed as a header field of the single header line;
   storing a first of the web feed articles in a folder of the email client;
   receiving a content update to the first web feed article;
   modifying a stored record of the first web feed article to reflect the content update; and
   displaying the content update to the first web feed article in an email message body display of the email application client in response to receiving an input to display the body of the first web feed article record stored in the folder.

2. A medium as in claim 1, the method further comprising: modifying a "Subject" header field of the first web feed article with an indication that the first web feed article has been updated.

3. A medium as in claim 1, the method further comprising: modifying a "Date" header field of the first web feed article with a publication date of the update.

4. A medium as in claim 1, wherein displaying the plurality of web feed articles in the single header line further comprises:
   displaying a thread control with the single header line to indicate the single header line is expandable into a multi-lined header display including a header line for each of the plurality of web feed articles; and
   displaying, in a "Subject" header field of the single header line display, at least one of: a web feed article title, a web feed article author, and a web feed article source.

5. A medium as in claim 1, wherein displaying the plurality of web feed articles in the single header line further comprises displaying, in a "Date" header field of the single header line, at least one of the date a web feed article was published to the feed and the date a web feed article was received by the email client application.

6. A medium as in claim 1, further comprising:
displaying, in response to receiving an input to select one of the plurality of header lines, a body of a first web feed article in an email message body display of the email client application, separate from the incoming email message display;
setting a read state of the first web feed article to indicate the article has been read; and synchronizing the read states of the first web feed article between the email client application and a second RSS client application executing on the data processing system.

7. A medium as in clam 1, wherein the request includes an identifier of the feed and an indication of the last time web feed content was retrieved from the feed.

8. A medium as in claim 1, the method further comprising expanding, in response to a single button activation, the single header line to display the plurality of web feed articles as a plurality of header lines of the incoming email message display.

9. A medium as in claim 1, wherein the syndication format is selected from the group consisting of: RSS 2.0 and Atom.

10. A method for displaying syndicated articles, the method comprising:
requesting web feed content in response to an input received in a display of an email client application executing on a processing system including a memory and a processor;
receiving, in response to the requesting, a plurality of web feed articles in a syndication format from a single source, the plurality of articles associated with different dates; and
displaying a single header line for two or more of the plurality of web feed articles associated with a same date wherein the single header line is displayed in-line with a header of a received email message in an incoming email message display of an email client application, and wherein at least one of a web feed article title and the web feed article source is displayed as a header field of the single header line;
storing, in the memory, a first of the web feed articles in a folder of the email client;
receiving a content update to the first web feed article;
modifying, with a processor of the processing system, a record of the first web feed article to reflect the content update; and
displaying the content update to the first web feed article in an email message body display of the email application client in response to receiving an input to display a body of the first web feed article stored in the folder.

11. A method as in claim 10, wherein displaying the plurality of web feed articles in the form of a threaded email message single header line further comprises:
displaying a thread control with the single header line to indicate the single header line is expandable into a multi-lined header display including a header line for each of the plurality of web feed articles; and
displaying, in a "Subject" header field of the incoming email message display single header line, at least one of: a web feed article title, a web feed article author, and a web feed article source.

12. A method as in claim 11, further comprising: expanding, in response to a single button activation, the single header line to display the plurality of web feed articles as a plurality of header lines of the incoming email message display.

13. A method as in claim 12, further comprising:
displaying, in response to receiving an input to select one of the plurality of header lines, a body of a first web feed article in an email message body display of the email client application, separate from the incoming email message display;
setting a read state of the first web feed article to indicate the article has been read; and synchronizing the read states of the first web feed article between the email client application and a second RSS client application executing on the data processing system.

14. An apparatus comprising:
a means for requesting web feed content in response to an input received in a display of an email client application executing on a data processing system;
a means for receiving, in response to the requesting, a plurality of web feed articles in a syndication format from a single source, the plurality of articles associated with different dates;
a means for displaying a single header line for two or more of the plurality of web feed articles associated with a same date in-line with a header of a received email message in an incoming email message display of an email client application, wherein at least one of a web feed article title and a web feed article source is displayed as a header field of the single header line;
a non-volatile storage means for storing a first of the plurality of web feed articles in a folder of the email client;
a means for receiving a content update to the first web feed article;
a processor means for modifying the stored record of the first web feed article to reflect the content update; and
a means for displaying the content update to the first web feed article in an email message body display of the email application client in response to receiving an input to display a body of the first web feed article stored in the folder.

* * * * *